Jan. 21, 1958    R. O. HELGEBY    2,820,429
SPACE AND NUMERICAL INDICATING INSTRUMENT
Filed July 29, 1954
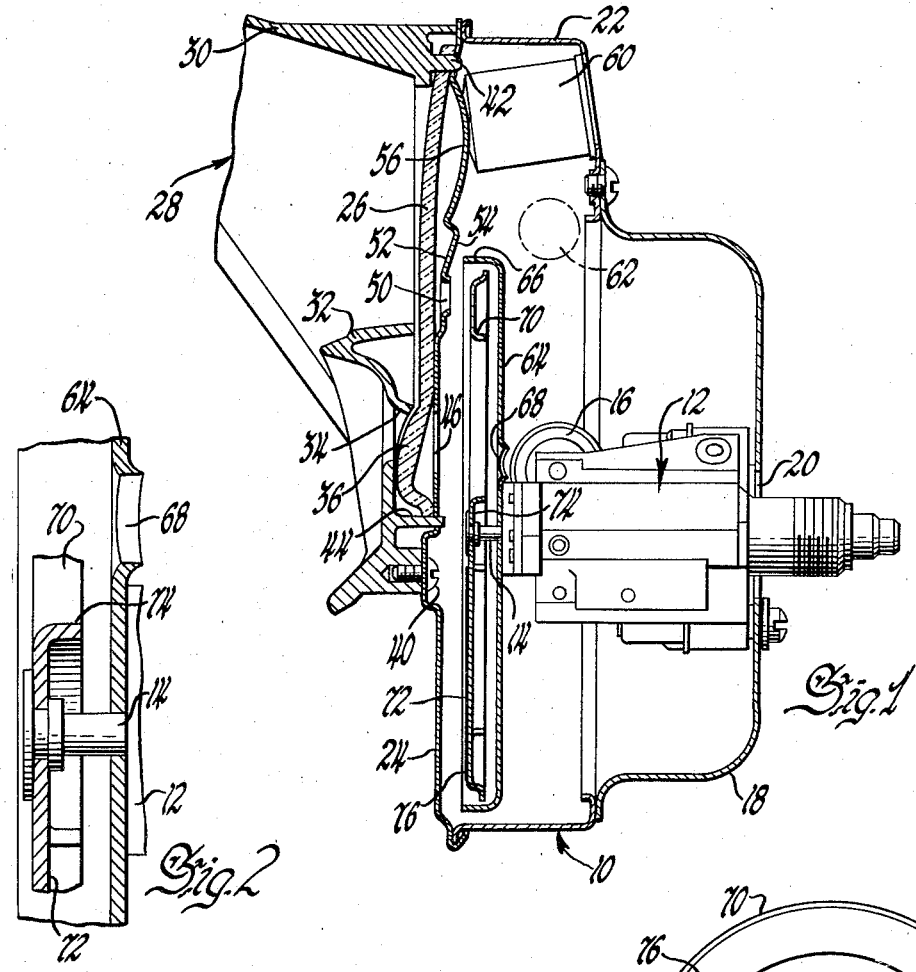
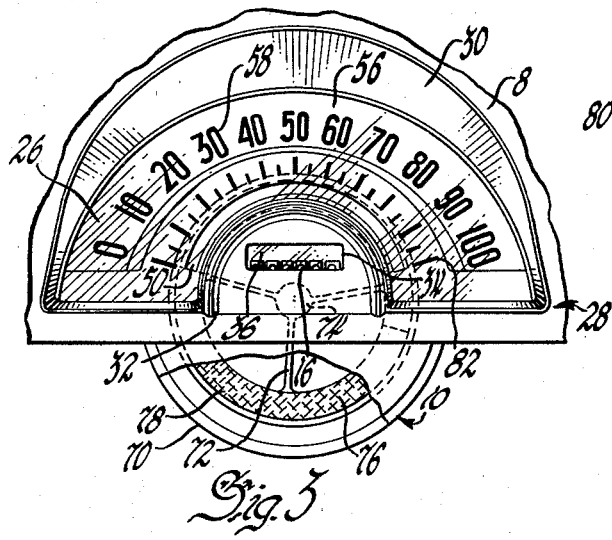
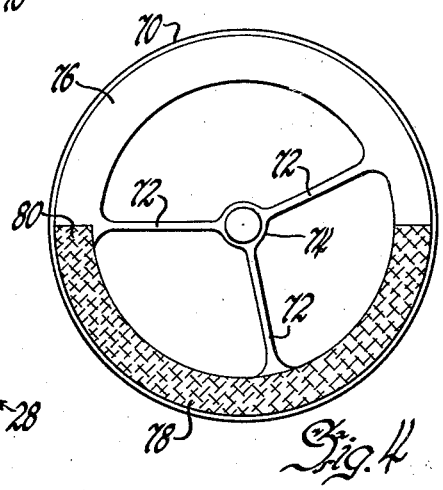
INVENTOR
Ralph O. Helgeby
BY
C. F. Dibble
ATTORNEY

United States Patent Office 2,820,429
Patented Jan. 21, 1958

2,820,429

SPACE AND NUMERICAL INDICATING INSTRUMENT

Ralph O. Helgeby, Flint, Mich., assignor to General Motors Corporation, Detroit, Mich., a corporation of Delaware Application July 29, 1954, Serial No. 446,596

1 Claim. (Cl. 116—57)

This invention relates to indicating instruments such as speedometers for vehicles and more particularly to an improved indicating instrument mounted in a casing and capable of giving a numerical and also a space indication of a measurement.

Instruments such as speedometers and pressure gauges have been developed heretofore in which numerical and space indications of a measurement are simultaneously given with the aid of lighting or colored effects. These serve to overcome ineffectual lighting conditions and distracting influences to give a more effective warning as a safety measure or clearer reading as an aid to the user. In such instruments, however, it has been difficult conveniently to incorporate a second instrument such as an odometer and to make the instrument well-balanced in operation and, at the same time, effective in its results.

It is an object of the present invention to provide an improved indicating instrument of compact and attractive form giving both a space and numerical indication of a measurement and, at the same time, being simple in construction and well-balanced in operation. Another object of the invention is to combine in the same instrument casing, a means for giving a space and numerical reading in simple and well-balanced form and a second instrument the operation and use of which is not affected by the first instrument.

To this end, an important feature of the present invention is an instrument comprising a casing having a window behind which a vivid, sharply-defined surface is adapted to be rotated, an opaque shield fixed in position between the window and the surface, and the shield having a slot through which the vivid surface may be observed as a space indication of the instrument reading.

Another feature of the invention is an instrument having a rotatable annulus carrying a vivid arc observable through a slot as a space indication of a reading of the instrument and a second instrument observable through arms supporting the annulus.

The above and other features of the invention will now be more particularly described in connection with the accompanying drawings and then pointed out in the appended claim.

In the drawings:

Fig. 1 is a sectional view in elevation of an instrument in which the present invention is incorporated;

Fig. 2 is an enlarged view of details shown in Fig. 1;

Fig. 3 is a front view of the instrument shown in Fig. 1 (reduced in scale), a portion thereof being broken away and showing that instrument as mounted on an instrument panel; and Fig. 4 is a front view of a rotatable annulus shown in Figs. 1 and 3 but drawn to a different scale.

The speedometer illustrated in the drawings is shown in Fig. 3 as mounted on an instrument panel 8 of a car and comprises a casing 10 and a speedometer mechanism 12 with the latter being adapted to rotate an indicator shaft 14 and an odometer 16. With the particular speedometer illustrated, the casing 10 comprises a cup 18 through an opening 20 of which the mechanism 12 is adapted to be operated as is conventional. The casing 10 also includes an intermediate casing portion 22 and a thin steel closure member or shield 24. The shield 24 is protected by a transparent clear plastic window 26 which is retained in place on the casing 10 by means of an ornamental bezel 28. The bezel 28 is composed of an outer arcuate portion 30 and an inner arcuate portion 32 between which a major portion of the window 26 may be seen. The inner arcuate portion 32 is ornamental in nature and is also provided with an opening 34 through which an enlarged lens-like portion 36 of the window 26 is observed.

The steel plate 24 of the casing and the bezel 28 are attached together by means of screws such as the screw 40 and also by locking tongues 42 and 44 integral with the bezel 28 and extending through suitable perforations made in the steel plate 24.

The steel plate 24 is perforated as at 46 to register with the lens portion 36 and the opening 34. Spaced a slight distance from the inner side of the window 26 is an arcuate slot 50 formed in the plate 24 and which is made concentric with the outer surface of the bezel portion 32. Above the slot 50 and extending radially and inwardly from the window 26 is an inclined portion 52 formed in the plate 24. The inner surface 54 of the portion 52 is therefore, also inclined inwardly and away from the window 26 as clearly shown in Fig. 1. Concentric with the slot 50 and formed as part of the plate 24 is an arcuate and radially curved section 56 upon which numerical indicia are placed and which are presented to view through the window 26.

An inner housing 60 is shown in Fig. 1 to include a light bulb to show whether the lights of the vehicle are dimmed or bright. This forms no part of the present invention and, therefore, the means for showing this light to the user is not further described. A second light 62 is mounted within the casing 10 and is utilized for carrying out one aspect of the present invention. It will be appreciated that this light may be located in a number of places within the casing 10, but its location as generally indicated in Fig. 1 is satisfactory for carrying out the present invention as will further appear.

Fixed to a stationary portion of the mechanism 12 is a cup-shaped member 64 having an annular flange 66 directed towards the window 26 and also a slot 68 in registry with the odometer 16, the slot 46 and the lens opening 34.

Rotatable within and conforming with the flange 66 is a rotatable member or annulus 70 which is fixed by means of three radial arms 72 to a hub 74 fixed to the shaft 14. The annulus 70 is dished to present a smooth surface 76 in the direction of the window 26. As seen in Fig. 4, a semi-circular portion 78 of this surface 76 is painted with a vivid color such as red. In the case of a speedometer it has been found advantageous although not essential to have the color extend through an arc of approximately 180° around the annulus.

In operation of the instrument, the annulus 70 will be so placed that the leading edge 80 of the colored or vivid surface 78 will correspond with the left-hand end of the slot 50 and the number 0 as viewed in Fig. 3. With an increase in speed of the vehicle the annulus 70 will rotate in a clockwise direction and the vivid surface 78 will progressively be viewable through the slot 50 to give the desired space and numerical reading. Under good lighting conditions the vivid arc may be clearly seen and presents a striking as well as attractive appearance.

The cup 64 serves to conceal a major portion of the interior of the casing 10 but the slot 68 permits view of the odometer 16. The arms 72 of the annulus 70 are made extremely narrow and, for this reason, they do not present any substantial or objectionable interference with the view of the odometer.

During night usage or under conditions when the vehicle lights must be used, reflection of the beams from the light 62 by the surface 54 will illuminate the vivid arc 78 and enhance the striking and attractive appearance of the latter as viewed through the slot 50.

It will be noted that the portion 52 of the plate 24 bears radial lines 82 and as the plate 24 is slightly separated from the window 26, sufficient light may pass through the slot 50 from the light bulb 62 pleasingly to illuminate the lines 82 as well as the numerals 58. It has been found that, in the arrangement shown, all the indicia are sufficiently and non-glaringly illuminated during the night by means of the light 62. The transparent window 26 is curved outwardly to add to the decorative effective as seen in Fig. 1, but a flat piece of plastic or glass would operate satisfactorily.

I claim:

An instrument such as a speedometer for giving a measurement comprising a casing enclosing a light source, a clear window in a wall of said casing, a shaft arranged to be rotated an extent in proportion to the magnitude of measurement, said shaft supported in said casing and being journaled with its axis at a blunt angle with said wall, an opaque cup fixed in position within said casing and including a flange, a disc fixed to said shaft for rotation within said cup, an arcuate portion of said disc presenting a vivid substance thereon to view through said window, a fixed opaque shield interposed between said window and said flange, a surface on said shield for reflecting and directing light around said flange to said vivid substance, and an elongated arcuate slot in said shield through which said vivid substance may be observed.

References Cited in the file of this patent

UNITED STATES PATENTS

| | | |
|---|---|---|
| 1,797,772 | Hickman | Mar. 23, 1931 |
| 2,579,806 | Dvorkin | Dec. 25, 1951 |
| 2,648,305 | Appleman | Aug. 11, 1953 |
| 2,759,447 | Helgeby | Aug. 21, 1956 |

FOREIGN PATENTS

| | | |
|---|---|---|
| 496,350 | Germany | Apr. 22, 1930 |